United States Patent
Takemoto

(10) Patent No.: US 8,664,860 B2
(45) Date of Patent: Mar. 4, 2014

(54) CATHODE HEATING DEVICE OF MAGNETRON, MICROWAVE GENERATING DEVICE AND METHOD OF PREHEATING CATHODE OF MAGNETRON

(75) Inventor: Dai Takemoto, Nishinomiya (JP)

(73) Assignee: Furuno Electric Company, Limited, Nishinomiya (JP)

(*) Notice: Subject to any disclaimer, the term of this patent is extended or adjusted under 35 U.S.C. 154(b) by 194 days.

(21) Appl. No.: 13/045,562

(22) Filed: Mar. 11, 2011

(65) Prior Publication Data

US 2011/0221345 A1  Sep. 15, 2011

(30) Foreign Application Priority Data

Mar. 12, 2010  (JP) ................ 2010-056439

(51) Int. Cl.
*H05B 39/00* (2006.01)

(52) U.S. Cl.
USPC ............................ 315/94; 315/106; 315/248

(58) Field of Classification Search
USPC ................. 315/39.51, 94–107, 248
See application file for complete search history.

(56) References Cited

U.S. PATENT DOCUMENTS

| 4,076,996 A * | 2/1978 | Maehara et al. ............. 315/106 |
| 4,171,514 A * | 10/1979 | Faxon ............................ 342/202 |
| 4,886,951 A * | 12/1989 | Matsumoto et al. .......... 219/760 |
| 5,250,774 A * | 10/1993 | Lee ................................ 219/760 |
| 5,274,208 A * | 12/1993 | Noda ............................. 219/715 |
| 2003/0042857 A1 | 3/2003 | Suzuki et al. |
| 2003/0121913 A1 * | 7/2003 | Hayami et al. ................ 219/730 |
| 2010/0155393 A1 * | 6/2010 | Suenaga et al. ............... 219/702 |

FOREIGN PATENT DOCUMENTS

| JP | 58-119809 A | 7/1983 |
| JP | 61-258429 A | 11/1986 |
| JP | S63-304593 A | 12/1988 |
| JP | 5-1839 A | 1/1993 |
| JP | 6-342058 A | 12/1994 |
| JP | H08-313620 A | 11/1996 |
| JP | 9-82112 A | 3/1997 |
| JP | 9-129366 A | 5/1997 |
| JP | 2000-65918 A | 3/2000 |
| JP | 3199909 B2 | 8/2001 |
| JP | 2001-342875 A | 12/2001 |
| JP | 3927387 B2 | 6/2007 |

* cited by examiner

*Primary Examiner* — Tung X Le

(74) *Attorney, Agent, or Firm* — Birch, Stewart, Kolasch & Birch, LLP

(57) ABSTRACT

This disclosure provides a device for heating a cathode of a magnetron, which includes a heater for heating the cathode of the magnetron, a heater current detecting module for detecting a value of heater current that flows into the heater, and a control module for determining the completion of preheating of the magnetron based on a change in the heater current.

12 Claims, 6 Drawing Sheets

CATHODE HEATING DEVICE OF MAGNETRON, MICROWAVE GENERATING DEVICE AND METHOD OF PREHEATING CATHODE OF MAGNETRON

CROSS-REFERENCE TO RELATED APPLICATION(S)

The application claims priority under 35 U.S.C. §119 to Japanese Patent Application No. 2010-056439, which was filed on Mar. 12, 2010, the entire disclosure of which is hereby incorporated by reference.

TECHNICAL FIELD

The present invention relates mainly to a device for heating a cathode of a magnetron, a microwave generating device, and a method of preheating the cathode of the magnetron.

BACKGROUND OF THE INVENTION

Conventionally, magnetrons have been known as instruments for generating microwaves, which are used for radar devices, microwave ovens, etc. In order to appropriately operate the magnetron, it is necessary to raise the temperature of a cathode of the magnetron to a certain temperature or above. If the cathode temperature of the magnetron is too low, the cathode may be damaged and, thus, the life of the magnetron may be shortened. For this reason, it is generally known that a heater is provided near the cathode and the cathode is preheated by applying current to the heater.

Since the magnetron cannot be used during the preheating, a device such as the radar device cannot be operated. Moreover, in order to certainly prevent from operating the magnetron while the temperature of the cathode is low, the preheating time length is set long enough in many cases. Therefore, a long waiting time is needed after turning on the device such as the radar device before making it into the ready-to-use state. JP3,199,909 and JP06-342058A disclose radar devices which can shorten the waiting time to some extent.

The radar device of JP3,199,909 is provided with a positioning device such as a GPS receiver, and is configured to acquire latitude and longitude information and date information from the positioning device. The radar device estimates a temperature around a ship concerned (which equips the radar device) based on the information and the past meteorological data. The preheating time of the magnetron is set shorter as the estimated temperature becomes higher (i.e., at a lower latitude or during summer) and, on the other hand, the preheating time is set longer as the estimated temperature becomes lower (i.e., at a higher latitude or during winter). Thereby, a suitable preheating time is set according to the ambient temperature to shorten the waiting time.

The radar device of JP06-342058A is provided with a temperature detector, and is configured to measure the temperature around the ship concerned. This radar device shortens the waiting time by setting the preheating time of the magnetron based on the ambient temperature.

However, the radar device disclosed in JP3,199,909 needs to be provided with the GPS receiver or the like, and, further needs to be connected with the GPS receiver. Therefore, the preheating time cannot be shortened by this radar device alone. Moreover, even if the radar device estimates the temperature based on the meteorological data, there is variation in climate, and since the preheating time has to have some margin taking the variation into consideration, the preheating time will become inevitably longer.

Meanwhile, since the radar device disclosed in JP06-342058A needs to be provided with the temperature detector, it will be high in cost. Moreover, since the preheating time of the magnetron involves not only the ambient temperature but the internal temperature of the radar device, the condition of the heater and the like, it is difficult to estimate the preheating time correctly. For these reasons, the preheating time will be inevitably longer to some extent, which is redundant, similar to the case of JP3,199,909.

SUMMARY OF THE INVENTION

The present invention is made in view of the above situations, and provides a cathode heating device that can suitably shorten a preheating time of a magnetron, as well as provides a microwave generating device and a method of preheating a cathode of the magnetron.

According to one aspect of the invention, a device for heating a cathode of a magnetron is provided, which includes a heater for heating the cathode of the magnetron, a heater current detecting module for detecting a value of heater current that flows into the heater, and a control module for determining the completion of preheating of the magnetron based on a change in the heater current.

When the temperature of the heater increases, the electric resistance of the heater typically also increases. Moreover, since the increasing rate of the heater temperature becomes smaller as the heater temperature increases, the rise of the electric resistance also becomes slower and the heater current decreases slower. Thus, since the temperature condition of the heater when preheating the magnetron can be determined based on the change in the heater current, the timing at which the preheating of the magnetron is completed can be known exactly. Therefore, the waiting time at the time of using the magnetron can be shortened.

The control module may determine the completion of preheating of the magnetron based on a timing at which the change in the heater current becomes below a predetermined threshold.

Since the control module can grasp with sufficient accuracy that the increasing rate of the heater temperature becomes slower and the heater temperature becomes above the predetermined temperature, the timing at which the preheating of the magnetron is completed can be known more exactly.

The control module may determine that the preheating of the magnetron is completed after a predetermined time passed from the timing at which the change in the heater current become below the predetermined threshold.

Since the control module can take the time needed for the heat from the heater to reach the entire cathode into consideration in addition to the temperature condition of the heater at the time of preheating the magnetron, the timing at which the preheating of the magnetron is completed can be known more exactly.

The predetermined time may be determined based on at least either one of a heat conduction time of the heater and a heat conduction time of the cathode of the magnetron.

Since an accurate value can be set as the time needed for the heat from the heater to reach the entire cathode, the timing at which the preheating of the magnetron is completed can be known more exactly.

The device may further include an informing module. The informing module may inform a progress of preheating of the magnetron based on the determination by the control module.

Since the user can grasp the progress of preheating of the magnetron, he/she can know when the magnetron will become ready to use.

According to another aspect of the invention, a microwave generating device is provided, which includes a magnetron for generating a microwave, and the cathode heating device. The magnetron includes a cathode, and an anode surrounding the cathode with a circumferential gap therebetween. The cathode heating device includes a noise removing module provided between the heater and the heater current detecting module and for cutting noise generated by the heater current under the influence of the magnetron.

Thereby, noise generated by the heater current under the influence of the magnetron can be prevented from affecting the current value detected by the heater current detecting module. Therefore, since the value of the heater current can be detected with sufficient accuracy, the temperature condition of the heater can be known more correctly. Therefore, since the timing at which the preheating of the magnetron is completed can be known more exactly, the waiting time for generating the microwave can be shortened.

According to another aspect of the invention, a radar device is provided, which includes the microwave generating device, a radar antenna for transmitting a microwave generated by the microwave generating device and receiving a corresponding reflection wave from a target object, and a signal processing module for obtaining information related to the target object based on the reflection wave received by the radar antenna.

Thereby, a radar device that can shorten the time required to be ready to use after boot-up can be achieved.

According to another aspect of the invention, a method of preheating a cathode of a magnetron is provided, which includes heating the cathode of the magnetron by a heater, detecting a value of current that flows into the heater, and determining the completion of preheating of the magnetron based on a change in the heater current.

When the temperature of the heater increases, the electric resistance which is indicated by the heater typically also increases. Moreover, since the increasing rate of the heater temperature becomes smaller as the heater temperature increases, the rise of the electric resistance also becomes slower and the heater current decreases slower. Thus, since the temperature condition of the heater when preheating the magnetron can be determined based on the change in the heater current, the timing at which the preheating of the magnetron is completed can be known exactly. Therefore, the waiting time at the time of using the magnetron can be shortened.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Figure 1:
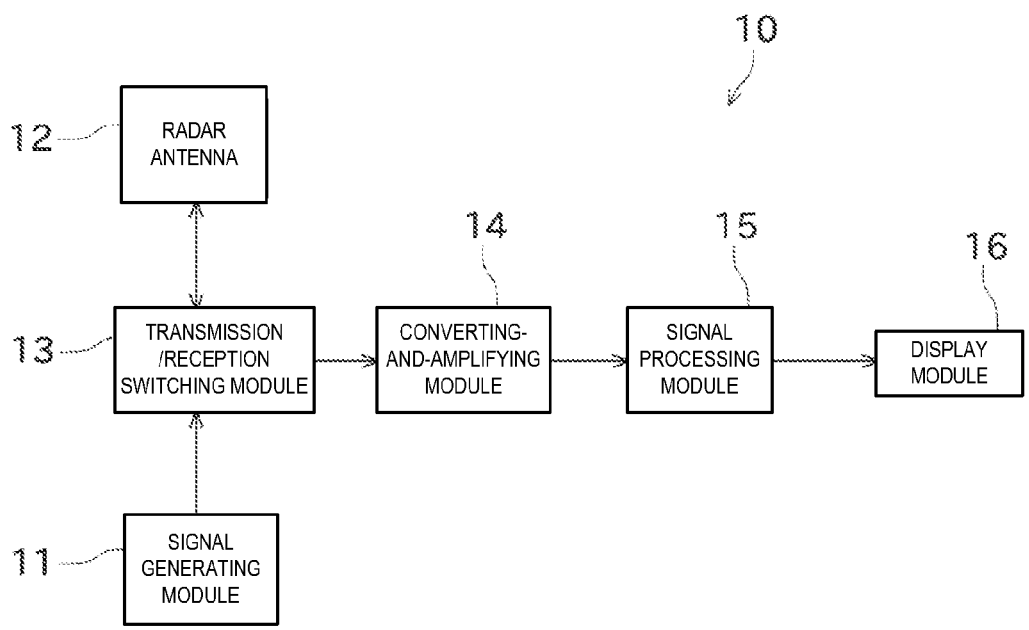
FIG. 1 is a block diagram showing an overall configuration of a radar device for a ship according to one embodiment of the present invention.

Hereinafter, one embodiment of the invention is described with reference to the accompanying drawings. FIG. 1 is a block diagram showing an overall configuration of a radar device 10 for a ship according to this embodiment.

The radar device 10 of this embodiment is constructed as what is called a pulse radar, and is carried in a ship. The radar device 10 emits signals (pulse-shaped radio waves) with a narrow directivity and receives echo signals (reflection signals) from target objects around the radar device 10 or the ship concerned. The radar device 10 utilizes the received echo signals to display the positions and the shapes of the target objects (including lands, other ships, etc.) around the ship. Hereafter, the configuration of the radar device 10 is described in details.

As shown in FIG. 1, the radar device 10 includes a signal generating module 11 (microwave generating device), a transmission/reception switching module 13, a converting-and-amplifying module 14, a signal processing module 15, and a display module 16 (informing module), as its main components.

The signal generating module 11 includes a magnetron and a magnetron drive circuit, and is configured to generate microwaves. The microwaves are sent to a radar antenna 12 via suitable waveguide paths. Note that the detailed configuration of this signal generating module 11 will be described later.

The radar antenna 12 transmits the microwave as the emission signals and receives the corresponding echo signals. Moreover, the radar antenna 12 performs the transmission and reception while rotating in a horizontal plane to detect the target objects around the ship concerned.

The transmission/reception switching module 13 is constructed by a circulator, for example. The transmission/reception switching module 13 can suitably switch the course of the signals so that the transmitted pulses with high energy from the signal generating module 11 is not applied to the reception side (that is, the converting-and-amplifying module 14 and the signal processing module 15) and all the echo signals is inputted into the reception side when receiving the echo signals.

The converting-and-amplifying module 14 includes a high frequency amplifier, a mixer, and an intermediate frequency amplifier. The converting-and-amplifying module 14 converts the echo signals received by the radar antenna 12 into signals having intensities and frequencies which are suitable for subsequent processing.

The signal processing module 15 includes a wave detector and an A/D converter as its main components. The signal processing module 15 detects the signals inputted from the converting-and-amplifying module 14 and then converts the signals into digital signals. Moreover, the signal processing module 15 acquires a distance to a target object based on a time lag between a timing at which the radar antenna 12 transmits the emission signal and a timing which the radar antenna 12 receives the corresponding echo signal. Then, the signal processing module 15 generates a radar image based on the acquired distance and a direction of the radar antenna 12 at the time of emitting the signal, and outputs the radar image to the display module 16.

Figure 2:
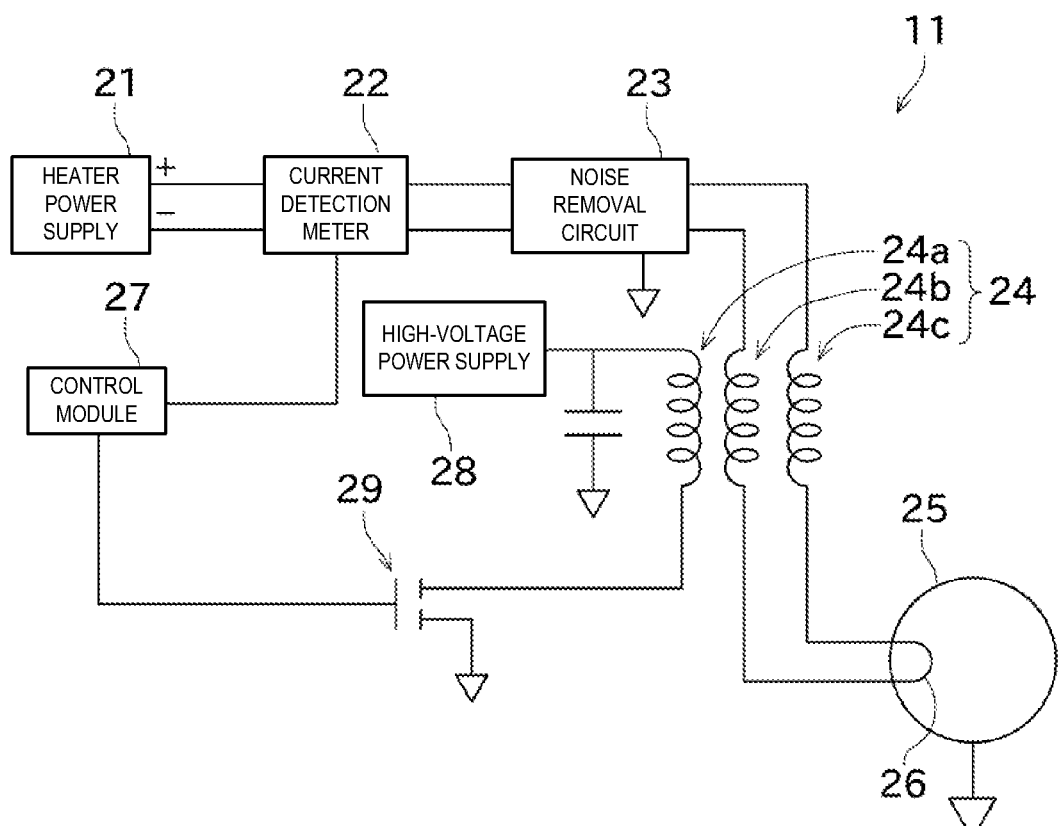
FIG. 2 is a block diagram showing a configuration of a signal generating module shown in FIG. 1.
Figure 3:
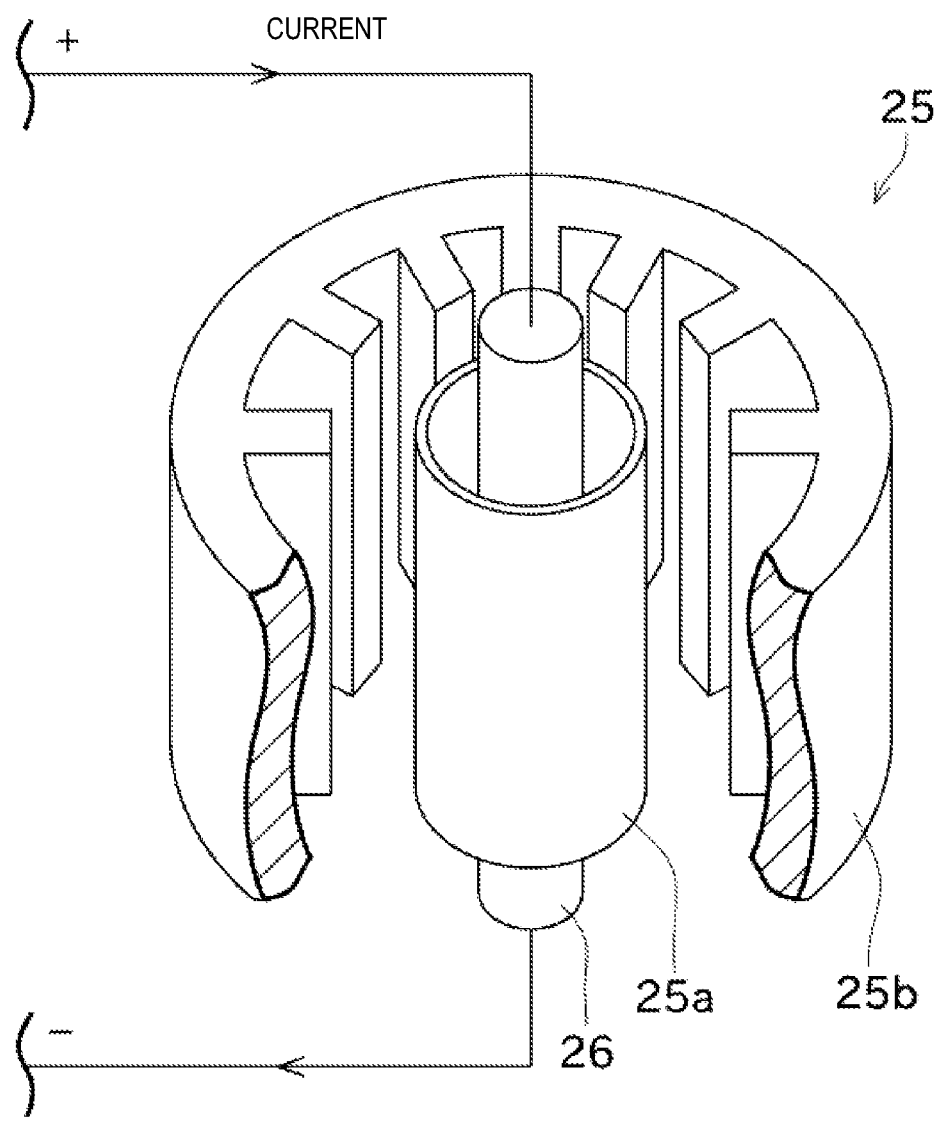
FIG. 3 is a perspective view of a magnetron shown in FIG. 2, which is partially cut off.

Next, the detailed configuration of the signal generating module 11 is described with reference to FIGS. 2 and 3. FIG. 2 is a block diagram showing the configuration of the signal generating module 11. FIG. 3 is a perspective view of a magnetron 25 which is partially cut off to show inside.

The signal generating module 11 includes a heater power supply 21, a current detection meter 22 (heater current detecting module), a noise removal circuit 23 (noise removing module), a pulse transformer 24, a magnetron 25, a heater 26, a control module 27, a high-voltage power supply 28, and an FET switch 29.

The heater power supply 21 uses a direct-current power supply in this embodiment and applies electric current to the heater 26. Note that, in the following description, the current which returns from output terminals of the heater power supply 21 back to the heater power supply 21 via the heater 26 may be referred to as "heater current."

The heater 26 has a high electric resistance member, and generates Joule heat when the heater current flows. The heater 26 preheats the magnetron 25 by the Joule heat.

As shown in FIG. 3, the magnetron 25 includes a cathode 25a and an anode 25b. The cathode 25a is formed in a cylindrical shape and arranged in the central part of the magnetron 25. The heater 26 is coaxially arranged so as to have a peripheral gap from the cathode 25a. The anode 25b is formed in a cylindrical shape, and arranged so as to surround the cathode 25a from the outside. In addition, two or more grooves parallel to the axial axis of the magnetron 25 are formed in the inner surface of the anode 25b.

The magnetic field is applied to the magnetron 25 along the axial axis. Note that, the configuration for generating the magnetic field is not illustrated in FIG. 3. However, for example, a coil may be provided around the anode 25b to which a current may be applied, or permanent magnets may be arranged above and below the anode 25b, in order to generate the magnetic field.

When the cathode 25a is fully heated by the heater 26, thermoelectrons are discharged from the outer circumferential surface of the cathode 25a. The electrons circulate in a space between the cathode 25a and the anode 25b (active space) under the influence of the magnetic field. Especially when the electrons pass through the groove portions (cavities) formed inside the anode 25b, electromagnetic waves (microwaves) of high frequency are generated.

The noise removal circuit 23 is constructed with a low pass filter having a coil and a capacitor. The noise removal circuit 23 is arranged between the current detection meter 22 and the heater 26, and removes noises generated by the heater current under the influence of the magnetic field applied to the magnetron 25, the microwaves and the like.

The current detection meter 22 is configured to output a signal proportional to the value of the heater current. The signal outputted from the current detection meter 22 is converted from analogue to digital and inputted into the control module 27 as a current value signal. Although the current detection meter 22 is not illustrated in detail, it may include current detection resistors arranged in series, a differential amplifier for detecting a difference in potential at both ends of the current detection resistance, and an A/D converter for carrying out analogue-to-digital conversion of a signal indicating the difference from the differential amplifier, for example.

The control module 27 determines whether preheating of the magnetron 25 is completed based on the current value signal. Moreover, the control module 27 transmits a pulse signal when the preheating of the magnetron 25 is completed. In addition, the process carried out by the control module 27 is described in details later.

Returning to FIG. 2, the pulse transformer 24 is provided with a first winding 24a, a second winding 24b, and a third winding 24c. One terminal of the first winding 24a is connected to the high-voltage power supply 28, and the FET switch 29 is provided to the other terminal. The FET switch 29 switches according to the pulse signal from the control module 27.

Accordingly, driving pulses having the same pulse width as that of the pulse signal are generated in the second winding 24b and the third winding 24c. Then, by applying the pulses to the magnetron 25, the magnetron 25 outputs the microwave which is pulse-modulated.

With the above configuration, the signal generating module 11 can generate the microwave having a predetermined pulse width. Note that, the portion of the signal generating module 11 excluding the magnetron 25 controls the heating of the cathode 25a of the magnetron 25 and, thus, it is referred herein to as a "cathode heating device" of the magnetron.

Figure 4A:
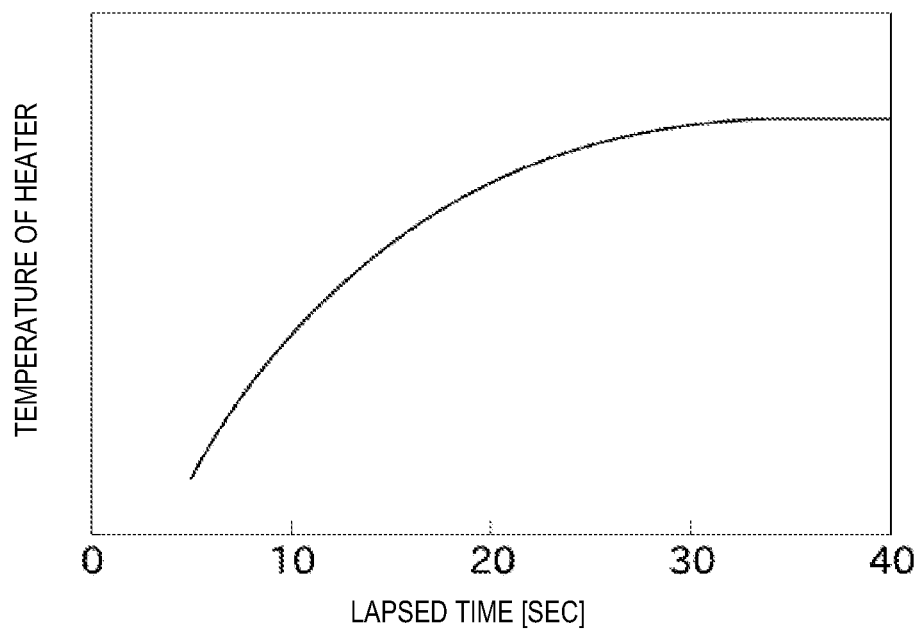
FIGS. 4A and 4B are graphs schematically showing a relation between a temperature of a heater and time, as well as a relation between an electric resistance of the heater and the time, respectively.
Figure 4B:
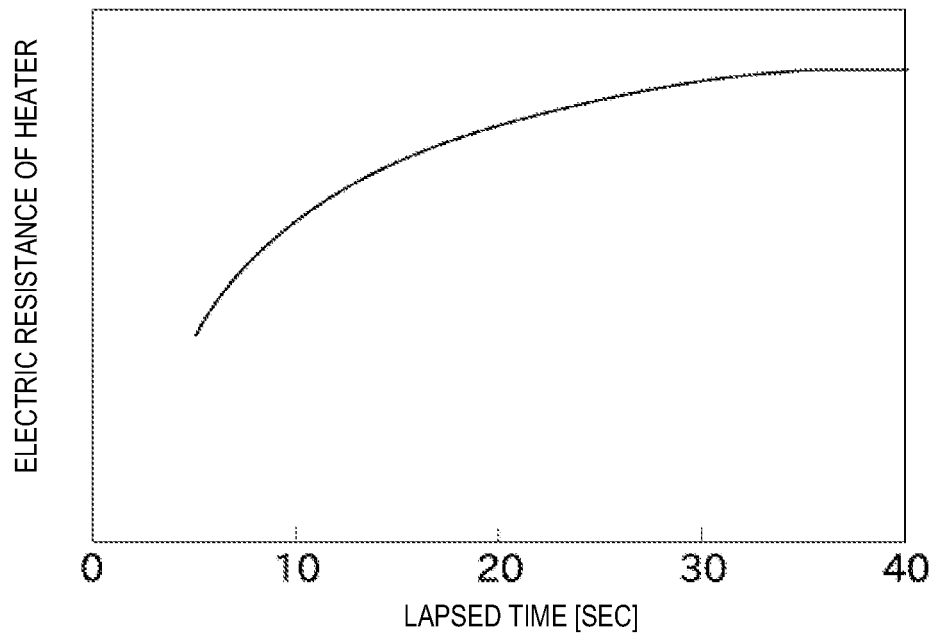
Figure 5A:
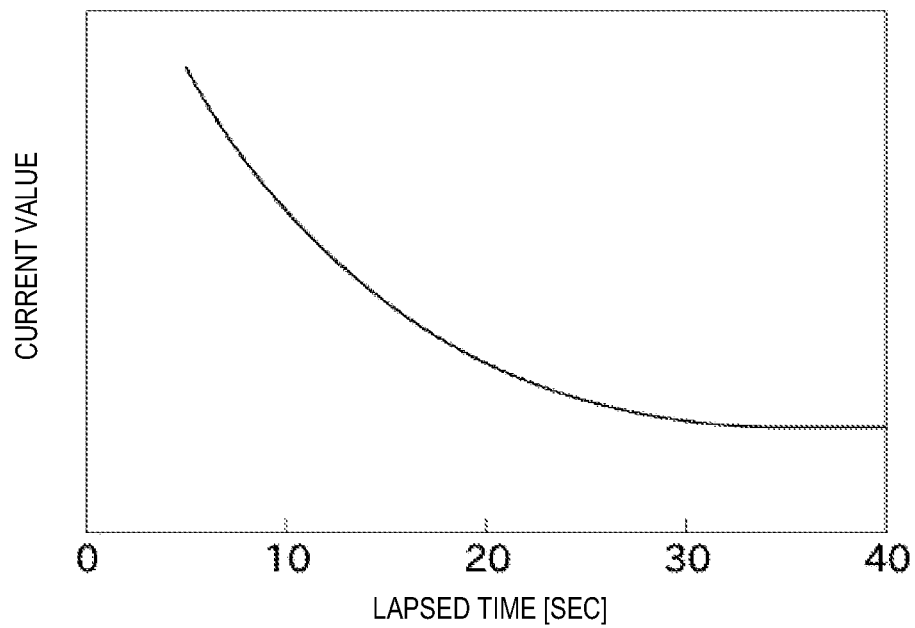
FIGS. 5A and 5B are graphs schematically showing a transition of a heater current with time and a transition of a change in the heater current with time, respectively.
Figure 5B:
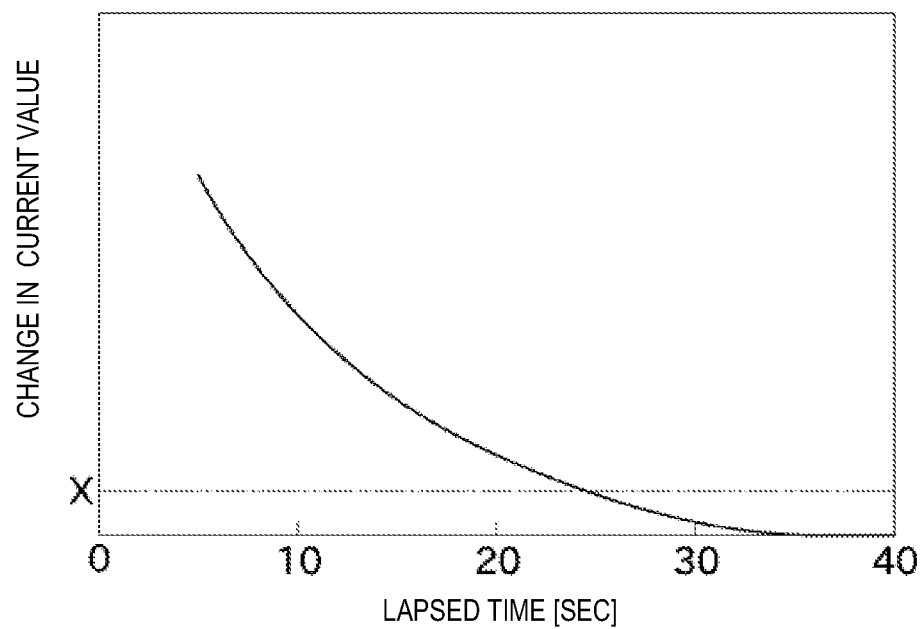
Figure 6:
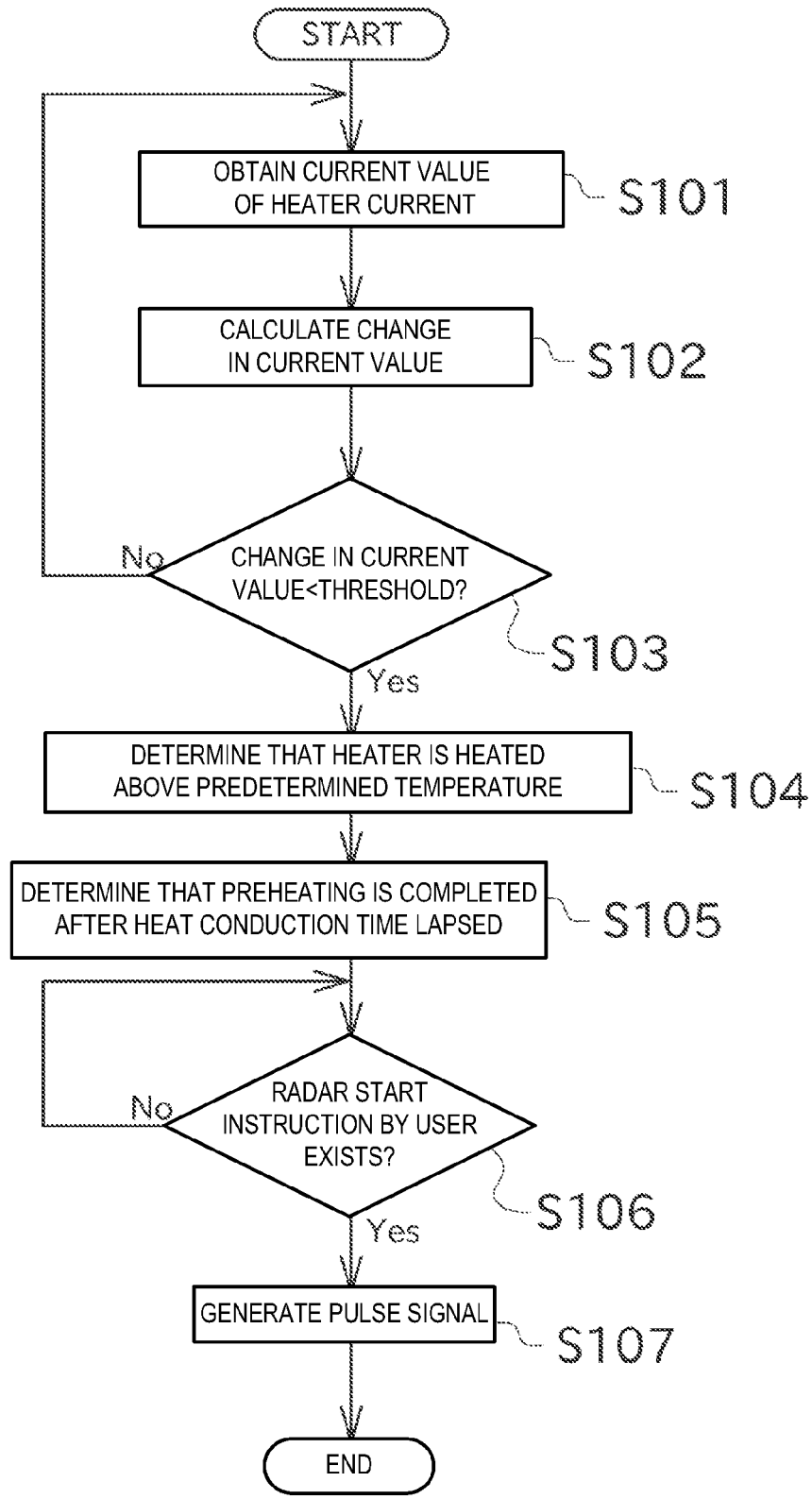
FIG. 6 is a flowchart showing a process of a control module shown in FIG. 2.

Next, referring to FIGS. 4A, 4B, 5A, 5B, and 6, and the process carried out by the control module 27 is described. FIGS. 4A and 4B show graphs schematically showing a transition of the temperature of the heater 26 with time and a transition the electric resistance of the heater 26 with time, respectively. FIGS. 5A and 5B show graphs showing a transition of heater current with time and a transition of a change in the heater current with time. FIG. 6 is a flowchart showing the process of the control module 27.

First, the mechanism of determining that the preheating of the magnetron 25 is completed based on a value of the heater current is described. As shown in FIG. 4A, the temperature of the heater rises when the supply of the heater current is started, and approaches a certain temperature. Note that the change in the temperature becomes smaller with time lapsed. Generally, it is known that the electric resistance of a substance increases according to the resistance temperature coefficient of the substance when the substance temperature is raised. Therefore, as shown in FIG. 4B, the change in the electric resistance of the heater 26 corresponds to the change in the temperature of the heater 26.

Moreover, the heater power supply 21 constantly applies substantially a fixed voltage to the heater 26. For this reason, as shown in FIG. 5A, the value of the heater current decreases gradually after the supply of the heater current is started, and approaches the certain current value. Therefore, as shown in FIG. 5B, the change in the value of the heater current decreases gradually.

As described above, the heater temperature is related to the change in the value of the heater current. Therefore, the control module 27 can determine that the preheating of the magnetron 25 is completed based on the value of the heater current.

Referring to the flowchart of FIG. 6, when the cathode 25a begins to be heated by the heater 26, a current value signal is inputted from the current detection meter 22 into the control module 27 (S101). The control module 27 calculates the change in the current value based on the current value signal (S102). Specifically, the control module 27 calculates a difference between a present current value ($I_n$) and a current value ($I_{n-1}$) of a predetermined time before (for example, 0.1 second), which is represented by $\Delta I = I_n - I_{n-1}$, as the change in the current value.

Note that, in this embodiment, the change per predetermined period of time is used as the change in the current value. Alternatively, the change per unit time may also be used as the change in the current value. Alternatively, the change in the current value may also be calculated by applying a suitable approximation to the relation between the detected current value and the time to obtain a current value function and differentiating the current value function.

Next, the control module 27 compares the change in the current value with a predetermined threshold (X) (S103). This is performed because the change in the current value becomes smaller as the heater temperature rises (refer to FIGS. 4 and 5) and, by setting a suitable threshold, the control module 27 can detect that the heater reaches the predetermined temperature or above. The value of the threshold may be set empirically or experimentally. Moreover, the threshold value may also be calculated based on the voltage value and the resistance temperature coefficient of the heater power supply 21.

Then, if the change in the current value becomes below the threshold (i.e., $\Delta I < X$), the control module 27 determines that the heater 26 is heated above the predetermined temperature (S104). In the example of transition of the heater current shown in FIG. 5B, when the lapsed time is about 25 seconds, the change in the current value becomes below the threshold.

Note that the method of determining whether the heater 26 is heated above the predetermined temperature is not limited to the above-mentioned method. For example, if fluctuation of the output of the heater power supply 21, noise contained in the current value signal, a rapid fall of the ambient temperature or the like occurs, the change in the current value may become below the threshold even if the heater 26 is not actually heated above the predetermined temperature. In order to avoid this situation, when the change in the current value over the predetermined time becomes below the threshold, the control module 27 may determines that the heater 26 is heated above the predetermined temperature.

Alternatively, pattern matching may be performed based on the behavior of the function which is obtained by differentiating the current value function to determine whether the heater 26 is heated above the predetermined temperature. Alternatively, the change in the current value may be determined taking disturbance into consideration by using a Kalman filter or the like to determine whether the heater 26 is heated above the predetermined temperature.

In this embodiment, the control module 27 determines that the preheating of the magnetron 25 is completed, after a predetermined time lapsed from the timing at which the heater 26 is determined to be heated above the predetermined temperature (S105). The predetermined time is set as a time length from the heater 26 being heated above the predetermined temperature until the cathode 25a reaching a sufficient temperature.

More specifically, the predetermined time is set in the control module 27 as a value calculated based on a heat conduction time of the heater 26 and a heat conduction time of the cathode 25a. The heat conduction time of the heater 26 is a time length after the heating part of the heater 26 generating heat until the heat reaching the outer circumferential surface of the heater 26. The heat conduction time of the cathode 25a is a time length after the heat reaches the surface of the cathode 25a until the heat reaching the outer circumferential surface of the cathode 25a (that is, the entire cathode 25a).

Note that, in this embodiment, since the inside of the magnetron 25 is substantially a vacuum space, the heat is not conducted from the heater 26 to the cathode 25a by the heat conduction but the heat is transferred to the cathode 25a by thermal radiation. For this reason, the predetermined time may be determined taking the radiation rate between the heater 26 and the cathode 25a into consideration. Thereby, a more suitable predetermined time can be set taking the heat transfer rate from the heater 26 to the cathode 25a into consideration.

In this embodiment, the control module 27 can calculate a remaining time to the completion of preheating based on the predetermined time, and can display the remaining time on the display module 16. Thus, a user can be notified the time when the radar device 10 will be ready to use based on the indication. Alternatively, the method of informing the user about the remaining time to the completion of preheating may include, other than the above-mentioned method, a method of displaying a bar-shaped scale on the display module 16 to visually inform the progress of processing, a method of displaying the progress of processing on the display module 16 in a percent form, and a method of preparing a buzzer or a lamp as the informing module and informing the progress of processing by sound or light.

In this embodiment, when the display module 16 displays the remaining time to the completion of preheating, the final check for activating the radar device 10 is performed. Then, when the user operates suitable input key(s) to permit the activation of the radar device 10, a radar start instruction is sent to the control module 27. In the meantime, after being determined that preheating of the magnetron 25 is completed, the control module 27 determines the existence of the radar start instruction (S106), and if the radar start instruction exists, the control module 27 generates the pulse signal (S107). When the pulse signal is generated, the pulse-shaped microwave is transmitted from the radar antenna 12, and the operation of the radar device 10 is started, as mentioned above.

As described above in this embodiment, the cathode heating device of the magnetron includes the heater 26, the current detection meter 22, and the control module 27. The heater 26 heats the cathode 25a of the magnetron 25 with Joule heat. The current detection meter 22 detects the value of the heater current which flows into the heater 26. The control module 27 determines the completion of preheating of the magnetron 25 based on the change in the heater current.

Thereby, the timing at which the preheating of the magnetron 25 is completed can be known exactly. Therefore, the waiting time at the time of using the magnetron 25 can be shortened. For example, in the conventional radar device, the preheating time is set in many cases to 180 seconds taking the use of the device in a cold climate into consideration. On the other hand, by using the radar device of this embodiment, it can be shortened to about 15 to 25 seconds at the ambient temperature.

Moreover, in the cathode heating device of the magnetron of this embodiment, the control module 27 determines the completion of preheating of the magnetron 25 based on the timing at which the change in the heater current becomes below the predetermined threshold.

Thereby, since the temperature rise of the heater 26 becomes slower and the fact that the heater 26 becomes above the predetermined temperature can be detected with sufficient accuracy, the timing at which the preheating of the magnetron 25 is completed can be known more exactly.

Moreover, in the cathode heating device of the magnetron of this embodiment, the control module 27 determines that the preheating of the magnetron 25 is completed after the predetermined time passed from the timing at which the change in the heater current become below the predetermined threshold.

Thereby, since the time needed for the heat from the heater 26 to reach the entire cathode 25a can be taken into consideration in addition to the temperature condition of the heater 26, the timing at which the preheating of the magnetron 25 is completed can be known more exactly.

Moreover, in the cathode heating device of the magnetron of this embodiment, the predetermined time is determined based on at least either one of the heat conduction time of the heater 26 and the heat conduction time of the cathode 25a of the magnetron 25.

Thereby, since the accurate value can be set as the time needed for the heat from the heater 26 to reach the entire cathode 25a, the timing at which the preheating of the magnetron 25 is completed can be known more exactly.

Moreover, the cathode heating device of the magnetron of this embodiment includes the display module 16. The display module 16 informs the user about the progress of preheating of the magnetron 25 based on the determination by the control module 27.

Thereby, since the user can grasp the progress of preheating of the magnetron 25, he/she can know when the radar device 10 will be ready to use.

Moreover, the signal generating module 11 of this embodiment includes a magnetron 25 and the cathode heating device of the magnetron. The magnetron 25 includes the cathode 25a and the anode 25b that is arranged so as to surround the cathode 25a with the circumferential gap therebetween. The cathode heating device of the magnetron includes the noise removal circuit 23. The noise removal circuit 23 is provided between the heater 26 and the current detection meter 22, and cuts the noise generated by the heater current under the influence of the magnetron 25.

Thereby, the noise generated by the heater current under the influence of the magnetron 25 can be prevented from affecting the current value detected by the current detection meter 22. Therefore, since the value of the heater current can be detected with sufficient accuracy, the temperature condition of the heater 26 can be known more correctly. Moreover, since the timing at which the preheating of the magnetron is completed can be known more exactly, the waiting time for generating the microwave can be shortened.

In this embodiment, the radar device 10 includes the microwave generating device, the radar antenna 12, and the signal processing module 15. The radar antenna 12 transmits the microwave generated by the microwave generating device, and receives the corresponding reflection wave from the target object. The signal processing module 15 obtains the information related to the target object based on the reflection wave received by the radar antenna 12.

Thereby, the radar device 10 which has shortened the time required to be ready to use after boot-up can be realized.

In this embodiment, the method of preheating the cathode of the magnetron 25 includes the heating step, the current value detecting step, and the determining step. The heating step heats the cathode 25a of the magnetron 25 by the heater 26. The current value detecting step detects the value of the current which flows into the heater 26. The determining step determines the completion of preheating of the magnetron 25 based on the change in the heater current. Note that, as described above, the order of performing the processes may not be limited and the processes may be performed simultaneously.

Thereby, the timing at which the preheating of the magnetron 25 is completed can be known exactly. Therefore, the waiting time at the time of using the magnetron 25 can be shortened.

Although one of suitable embodiments of the present invention is described above, the above-mentioned configuration of the embodiment may be changed as follows, for example.

Although the example in which the cathode heating device of the magnetron and the microwave generating device are applied to the radar device is described above, alternatively, they may be applied to a communication instrument that performs communication by using microwaves other than the radar device.

The radar device is applicable not only to the ship radar device but the radar device of other uses. Moreover, the radar device of this embodiment is not limited to the pulse radar device, and may be applied also to the radar devices of other types, such as an FMCW radar, etc.

In this embodiment, although the completion of preheating of the magnetron is determined by digital control, it may also be determined using analog circuitry.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

What is claimed is:

1. A device for heating a cathode of a magnetron, comprising:
   a heater for heating the cathode of the magnetron;
   a heater current detecting module for detecting a value of heater current that flows into the heater;

a control module for determining the completion of preheating of the magnetron based on a change in the heater current;

a heater power supply; and a high-voltage power supply, wherein the heater power supply is configured to supply power, in the form of a fixed voltage, which is used by the heater to heat the cathode, the heater current flowing from the heater power supply into the heater, and wherein the high-voltage power supply is configured to supply a signal, which is used to drive the magnetron to generate a microwave.

2. The device of claim 1, wherein the control module determines the completion of preheating of the magnetron based on a timing at which the change in the heater current becomes below a predetermined threshold.

3. The device of claim 2, wherein the control module determines that the preheating of the magnetron is completed after a predetermined time passed from the timing at which the change in the heater current become below the predetermined threshold.

4. The device of claim 3, wherein the predetermined time is determined based on at least either one of a heat conduction time of the heater and a heat conduction time of the cathode of the magnetron.

5. The device of claim 1, further comprising an informing module, wherein the informing module informs a progress of preheating of the magnetron based on the determination by the control module.

6. A microwave generating device, comprising:
a magnetron for generating a microwave; and
the cathode heating device of claim 1;
wherein the magnetron includes:
   a cathode; and
   an anode surrounding the cathode with a circumferential gap therebetween; and
wherein the cathode heating device includes:
   a noise removing module provided between the heater and the heater current detecting module and for cutting noise generated by the heater current under the influence of the magnetron.

7. A radar device, comprising:
the microwave generating device of claim 6;
a radar antenna for transmitting a microwave generated by the microwave generating device and receiving a corresponding reflection wave from a target object; and a signal processing module for obtaining information related to the target object based on the reflection wave received by the radar antenna.

8. The device of claim 1, further comprising a pulse transformer which receives the signal from the high-power voltage supply and, after the control module determines that the preheating of the magnetron is completed, is controlled by the control module to transform the received signal into a driving pulse which is transmitted to the magnetron in order to cause the magnetron to generate a pulse-modulated microwave.

9. The device of claim 8, further comprising:
a field-effect transmitter (FET) switch which performs switching according to a pulse signal output by the control module when preheating of the heater is determined to be completed,
wherein the switching by the FET switch causes pulse transform to generate a driving pulse of the same width as the pulse signal output by the control module.

10. A method of preheating a cathode of a magnetron, comprising:
heating the cathode of the magnetron by a heater;
detecting a value of current that flows into the heater;
determining the completion of preheating of the magnetron based on a change in the heater current;
supplying a first power supply to the heater for use in heating the cathode, the first power supply being in the form of a fixed voltage, the heater current flowing from the first power supply to the heater; and
supplying a second power supply to drive the magnetron to generate a microwave, the second power supply being in the form of a high-voltage signal.

11. The method of claim 10, wherein the high-voltage signal of the second power supply is supplied to a pulse transformer, the method further comprising:
after determining the completion of the preheating of the magnetron, controlling the pulse transformer to transform the high-voltage signal into a driving pulse which is transmitted to the magnetron in order to cause the magnetron to generate a pulse-modulated microwave.

12. The method of claim 11, wherein the pulse transformer is controlled by:
transmitting a pulse signal to a field-effect transmitter (FET) when preheating of the heater is determined to be completed, the pulse signal causing the FET switch to perform a switching which causes the pulse transform to generate a driving pulse of the same width as the pulse signal output by the control module.

* * * * *